(12) United States Patent
Etorre et al.

(10) Patent No.: US 12,587,297 B2
(45) Date of Patent: Mar. 24, 2026

(54) METHOD OF SYNCHRONIZING A MAIN SLAVE CLOCK WITH A MAIN MASTER CLOCK

(71) Applicant: DEVIALET, Paris (FR)

(72) Inventors: Guillaume Etorre, Le Vesinet (FR); Didier Colin, Paris (FR); Pete Sedcole, Boulogne-Billancourt (FR); Eduardo Mendes, Chabeuil (FR)

(73) Assignee: DEVIALET, Paris (FR)

( * ) Notice: Subject to any disclaimer, the term of this patent is extended or adjusted under 35 U.S.C. 154(b) by 369 days.

(21) Appl. No.: 18/331,478

(22) Filed: Jun. 8, 2023

(65) Prior Publication Data

US 2023/0403092 A1    Dec. 14, 2023

(51) Int. Cl.
*H04J 3/06*          (2006.01)
*G05B 11/36*        (2006.01)

(52) U.S. Cl.
CPC ............ *H04J 3/0664* (2013.01); *G05B 11/36* (2013.01)

(58) Field of Classification Search
CPC ................................................... H04J 3/0664
See application file for complete search history.

(56) References Cited

U.S. PATENT DOCUMENTS

| | | | | |
|---|---|---|---|---|
| 2006/0233266 A1* | 10/2006 | Suetsugu | .............. | H04N 5/775 |
| | | | | 375/E7.278 |
| 2007/0226530 A1* | 9/2007 | Celinski | ................ | H04J 3/0664 |
| | | | | 713/500 |
| 2009/0204843 A1* | 8/2009 | Celinski | ................... | G06F 1/12 |
| | | | | 713/400 |

| | | | | |
|---|---|---|---|---|
| 2010/0074278 A1* | 3/2010 | Dobjelevski | .......... | H04J 3/0697 |
| | | | | 370/503 |
| 2013/0301635 A1* | 11/2013 | Hollabaugh | ...... | H04W 56/0035 |
| | | | | 370/350 |
| 2019/0045304 A1* | 2/2019 | Bhalla | ...................... | H04R 3/12 |
| 2019/0261439 A1* | 8/2019 | Itagaki | ................. | H04W 76/11 |
| 2021/0337498 A1* | 10/2021 | Lee | ...................... | H04J 3/0664 |

FOREIGN PATENT DOCUMENTS

| | | |
|---|---|---|
| WO | 2007076575 A1 | 7/2007 |
| WO | 2017178371 A1 | 10/2017 |
| WO | 2021198457 A1 | 10/2021 |

OTHER PUBLICATIONS

FR 2205504, INPI Rapport de Recherche Preliminaire, Jan. 16, 2023, 2 pages.

* cited by examiner

*Primary Examiner* — Abdelnabi O Musa
(74) *Attorney, Agent, or Firm* — Soquel Group LLC

(57) ABSTRACT

A method of synchronization of a slave master clock of a set of slave equipment with a master main clock of a set of master equipment, on the basis of a common time base, including receiving, by the master equipment and by the slave equipment, clock pulses from the common time base, performing, from the master equipment and the slave equipment, a master timestamping and a slave timestamping of clock pulses received on the basis of the common time base, on the base of the master and the slave main clocks, respectively, for generating the master and the slave timestamping information, communicating the master timestamping information to the slave equipment, and regulating, in the slave equipment, the slave main clock on the basis of the master timestamping information communicated and on the basis of the slave timestamping information generated.

7 Claims, 2 Drawing Sheets

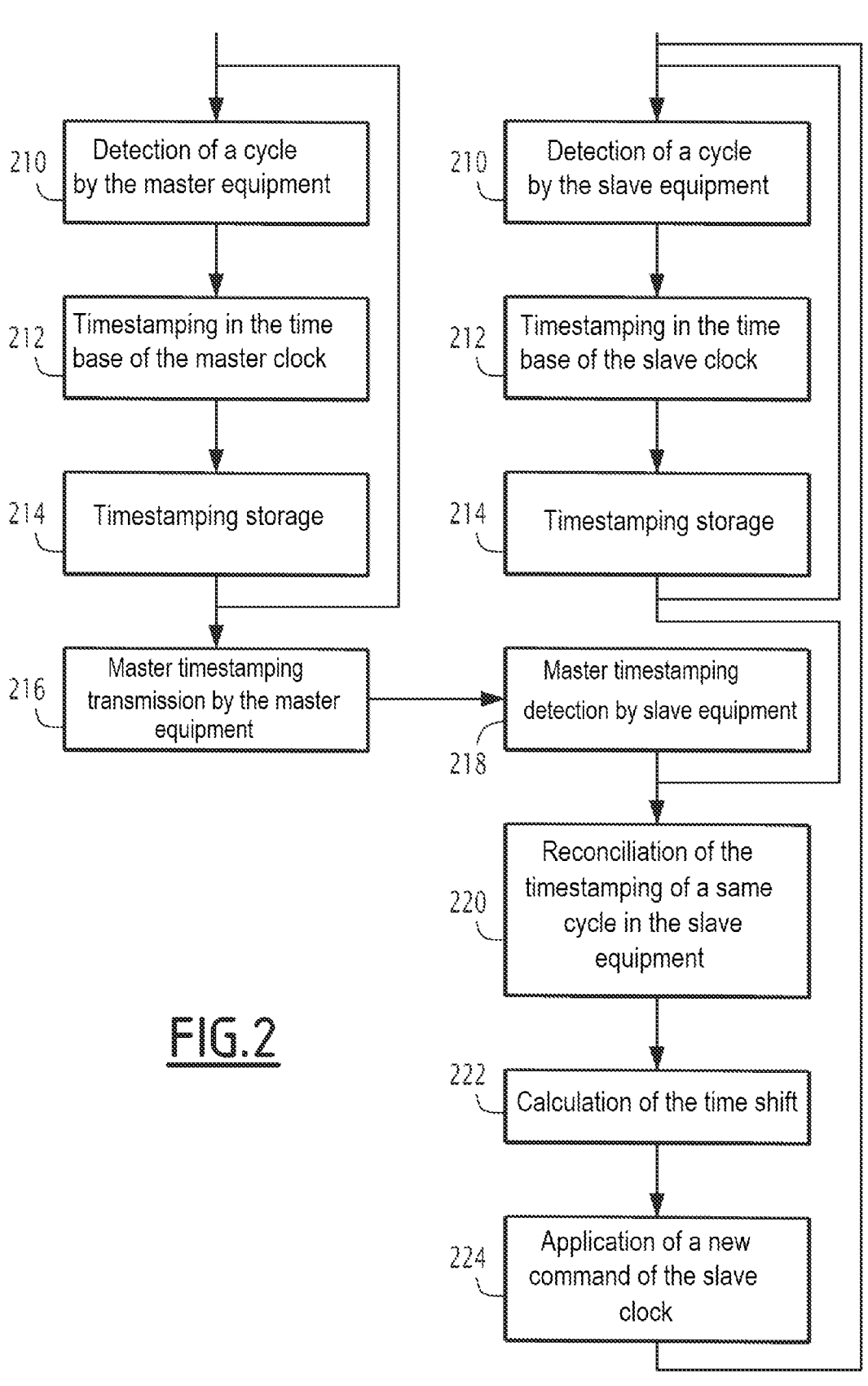

210   Detection of a cycle by the master equipment

212   Timestamping in the time base of the master clock

214   Timestamping storage

216   Master timestamping transmission by the master equipment

210   Detection of a cycle by the slave equipment

212   Timestamping in the time base of the slave clock

214   Timestamping storage

218   Master timestamping detection by slave equipment

220   Reconciliation of the timestamping of a same cycle in the slave equipment

222   Calculation of the time shift

224   Application of a new command of the slave clock

FIG.2

METHOD OF SYNCHRONIZING A MAIN SLAVE CLOCK WITH A MAIN MASTER CLOCK

CROSS-REFERENCE TO PRIORITY APPLICATION

This application claims priority of French Patent Application No. 22 05504, filed on Jun. 8, 2022.

FIELD OF THE INVENTION

The present invention relates to a method for synchronizing the time of a slave main clock of a set of slave equipment with the time of the master main clock of a set of master equipment, on the basis of a common time base.

BACKGROUND OF THE INVENTION

It is known, in particular on the basis of the document Devialet U.S. Ser. No. 10/134,442, how to synchronize audio systems on the basis of a time base generated by a local clock of each audio system. Such local clocks are synchronized on the basis of a common time base at or 60 Hz coming from the detection of the instants when the mains supplied by the power supply network goes through the zero value.

However, such synchronization method has a drawback which is that same is dependent on the frequency of the mains, which varies considerably over time. The frequency varies in the order of 50 to 200 mHz, or even more, i.e. variations on the order of 1000 to 4000 ppm.

Such variations make it impossible to achieve accurate synchronization between systems which do not use a similar synchronization device.

Such problem arises, e.g., during the reproduction of a sound signal on equipment implementing the method described in the document U.S. Ser. No. 10/134,442 and on other equipment implementing another synchronization method. It is then difficult to maintain the broadcasting time differences between the different equipment at values compatible with the recommendations of Apple Air Play Legacy, AirPlay 2, Google Cast for Audio or Amazon Multi room Music.

The document US 2006/0233266 describes a method for synchronizing two sets of equipment for the simultaneous sound reproduction of sound samples. In such method, the different sets of equipment detect the same transitions to 0 of the mains and each generate a specific time base thereof. The samples to be reproduced are transmitted from a first device to the other set of equipment, accompanied by a time information coming from the transmitting device and corresponding to the instant of transmission in a specific time base thereof. On the basis of such information, the receiver equipment compares the instant of transmission of the sample to be reproduced with the instant of their own time base thereof and corrects their own time base thereof so that simultaneous reproduction can take place.

SUMMARY OF THE DESCRIPTION

The main purpose of the method described in the present document is to compensate for the variations due to the transport time of the samples to be reproduced but cannot be used for a fine synchronization of the time bases of the different equipment on the basis of the mains going through 0.

The goal of the invention is to propose a method of clock synchronization, one master clock and one or a plurality of slave clocks present in equipment which, by using a common time base which is not very stable in frequency, can be nevertheless used for a very precise synchronization of the clocks.

To this end, the subject matter of the invention relates to a method for synchronizing a slave main clock of a set of slave equipment with a master main clock of a set of master equipment, on the basis of a common time base comprising the steps of:

reception, by the master equipment and by the slave equipment, of clock pulses from the common time base;

performing, from the master equipment and from the slave equipment, a master timestamping and a slave timestamping of at least some of the clock pulses received from the common time base, on the basis of the master main clock and of the slave main clock, so as to generate the master timestamping information and the slave timestamping information;

communicating the master timestamping information to the slave equipment;

regulating, in the slave equipment, the slave main clock on the basis of the master timestamping information communicated and of the slave timestamping information generated.

According to particular embodiments used, the method includes one or a plurality of the following features:

the step of receiving the clock pulses of the common time base including the step of generating the clock pulses, on the basis of the detection of the crossing through at least one threshold of the periodic signal of a power supply network;

the timestamping information includes a sequence number of the clock pulse received from the common time base and a timestamping instant of the pulse of the main clock of the equipment;

the time base of the master clock is constructed on the basis of a sub-multiple of the clock frequency of a crystal, the sub-multiple being controlled on an external time base;

the time base of the master clock is constructed on the basis of a sub-multiple of the clock frequency of a crystal, the sub-multiple being fixed;

the regulation of the slave main clock uses a proportional integral derivative controller;

A further subject matter of the invention relates to a set of slave sound reproduction equipment including a slave main clock and means of sound reproduction on the base of the slave main clock, the equipment including:

means for receiving clock pulses from a common time base;

means for performing a slave timestamping of at least some of the clock pulses received from the common time base (30) on the base of the slave main clock, so as to generate slave timestamping information;

means for receiving master timestamping information of at least some of the clock pulses received from the common time base, generated by a set of master equipment; and means for regulating, in the slave equipment, the slave main clock, on the basis of the received master timestamping information and the slave timestamping information generated;

A further subject matter of the invention relates to a set of master sound reproduction equipment including a master main clock and means of sound reproduction on the base of the master main clock, the equipment then including:

means for receiving clock pulses from a common time base;

means for performing a master timestamping of at least some of the clock pulses received from the common time base on the base of the master main clock, so as to generate slave timestamping information; and means for transmitting master timestamping information to a slave equipment.

BRIEF DESCRIPTION OF THE DRAWINGS

The invention will be better understood upon reading the following description, given only as an example and making reference to the drawings, wherein:

FIG. 2 is a flow chart of a method used by the method according to the invention.

DETAILED DESCRIPTION OF EMBODIMENTS

Figure 1:
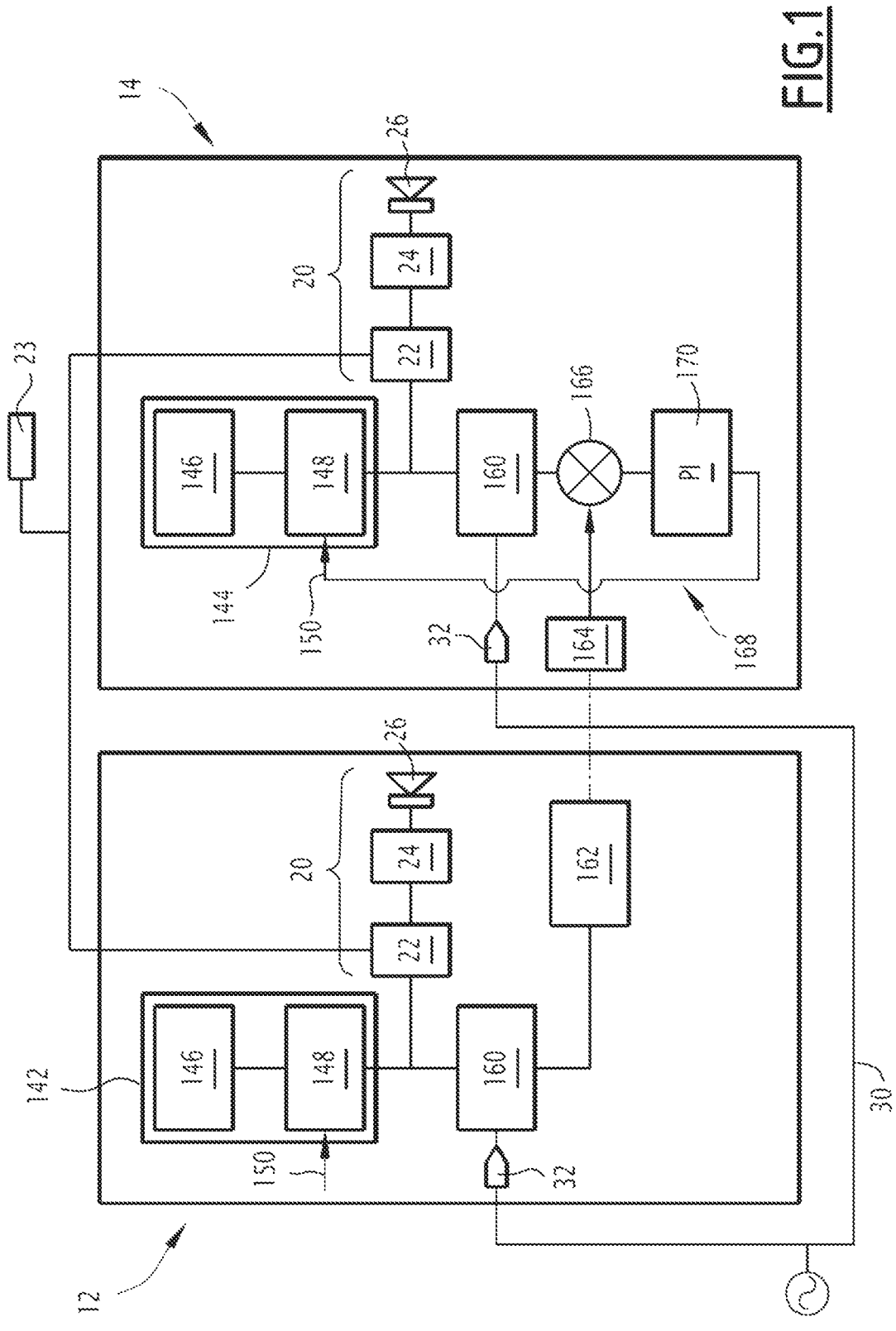
FIG. 1 is a schematic view of a sound reproduction assembly including a master equipment and a slave equipment.

FIG. 1 shows two sets of sound reproduction equipment, the master equipment denoted by 12 and the slave equipment denoted by 14.

The two sets of equipment each include means 20 for the sound reproduction of an audio stream including e.g. an information processing unit 22 and an amplifier 24 connected to a loudspeaker 26.

The information processing unit 22 is connected to an audio signal source 23, such as a WiFi network, a wired network, or any other information transmission means suitable for providing an audio stream consisting of a succession of samples each associated with time-dependent reproduction information.

Each set of equipment 12, 14 is connected to an electrical supply network 30 for the powering thereof and for providing a common time base to each of the two sets of equipment.

As is known per se, the network supplies an electric current with a frequency of 50 or 60 Hz depending on the geographical area. The precision of such frequency is usually on the order of 1000 to 4000 ppm.

Each set of equipment 12, 14 includes, connected to the power supply network, a module 32 for detecting cycles of the electrical network. The module uses a hysteresis comparator for filtering any interference present on the power supply. The switching thresholds for a supply voltage of 230 V are taken to be equal e.g. to 43 V when the mains voltage changes from a value below 43 V to a value above 43 V, and to 11 V when the voltage decreases from a value above 11 V to a value below 11 volts.

Advantageously, when the hysteresis comparator proves to be insufficient for filtering the interference from the power supply network, a digital filter is implemented in a processor, e.g. the power supply processor of each set of equipment.

The different modules 32 for detecting cycles are suitable for providing at the output thereof, the same clock signal with a frequency equal to 100 Hz or 120 Hz depending on the frequency of the mains, the output signal forming a common time base for the two sets of equipment, the frequency of which depends only on the variations in the frequency of the mains.

Each set of equipment 12, 14 includes a specific main clock thereof assigned by the master main clock 142 for the master equipment 12, and assigned by the slave main clock 144 for the slave equipment 114.

Each clock includes a crystal 146 suitable for generating a reference clock frequency equal to e.g. 25 MHz for each of the two clocks.

The output of each crystal 146 is connected to the input of a numerically controlled oscillator 148. The oscillator 148 is suitable for dividing the frequency of the clock signal by a division coefficient received at an input 150. The numerically controlled oscillator 148 is suitable for supplying at the output thereof, a natural frequency close to 48 kHz, i.e. with a division coefficient close to 521.

The output of the main clock 142, 144 is connected to the means of sound reproduction 20, so as to provide same with a time base enabling same to synchronize and simultaneously reproduce the samples.

According to the invention, each equipment further includes a timestamping module 160 connected to the output of the main clock 142, 144 and a triggering input of which is connected to the output of the electronic circuit for detecting cycles 32 of the equipment considered.

The timestamping modules 160 are suitable for time-stamping each detection of cycle of the mains, supplied by the signal coming from the module 32. At the output, the timestamping module supplies, for each cycle, timestamping information consisting of a pair consisting of the sequence number of the cycle of the mains, as detected by the module 32 and of the timestamping instant supplied by the main clock 142, 144.

The timestamping is thus performed in the equipment 12 in a time base specific to the master main clock 142 and in the equipment 14 in a time base specific to the slave main clock 144. The timestamping information is assigned by the master timestamping information when same is generated by the module 160 of the master equipment 12 and slave timestamping information when same is generated by the module 160 of the slave equipment 14.

The master equipment 12 includes, at the output of the timestamping circuit 160, means 162 for transmitting the master timestamping information to a reception module 164 provided in the slave equipment 14. Such means of transmission, known per se, implement e.g. a carrier current technology, or a WiFi technology or use the communication network 23 providing the transmission of the musical streams to be reproduced.

The slave equipment 14 includes a comparator 166 suitable for determining the time shift between the timestamping instants contained in the master and slave timestamping information, for the detection of the same cycle performed by the master equipment 12 and the slave equipment 14. To check the detection of the same cycle, the comparator 166 includes means of comparing the sequence numbers of the cycles contained in the master and the slave timestamping information and is suitable for determining the time shift for a detection of the same cycle between the detection instants expressed for one in the time base of the master clock 142, and for the other, in the time base of the slave clock 144.

The slave equipment 14 includes a regulation loop 168 suitable for controlling the numerically controlled oscillator 148, on the basis of the time shift between the timestamping instants, in order to ensure a synchronization of the clocks 142 and 144.

Advantageously, the regulation loop uses a proportional-integral-derivative (PID) controller 176.

Thereby, if the timestamping time of a detection of cycle in the time base generated by the master main clock 142 is ahead of the timestamping time of the same detection of cycle in the time base generated by the slave main clock 144, then the division coefficient applied to the numerically controlled oscillator 148 of the clock 144 is reduced and brought e.g. to 522 or 521.

Each information processing unit 22 of the means of sound reproduction of each equipment is connected to the output of the main clock 142, 144 and includes software means for synthesizing an audio clock on the basis of the main clock of the equipment. The audio clock is used for the reproduction of audio samples as known per se according to a rhythm defined by the time-dependent reproduction information contained in the audio signal.

According to a first embodiment, the input 150 of the numerically controlled oscillator 148 of the master main clock 142 receives a fixed value over the course of time, herein equal to 521 in the example considered.

In a variant, the master equipment 142 includes a chain for temporal analysis of an external signal suitable for receiving as input e.g. an optical signal carrying an audio stream coming from a DVD player. The chain is suitable for determining the frequency of the optical signal broadcast clock and for calculating the division ratio to be applied to the numerically controlled oscillator 148 of the master main clock 142, so that the frequency of the master main clock 142 is equal to the broadcast clock frequency of the signal. The output of the detection chain is connected to the control input 150 of the master main clock 142.

In a variant, all the sets of equipment are potentially master and slave and include, for this purpose, all the described elements of a set of master equipment and of a set of slave equipment. During the forming of the network, the master or slave status thereof is defined according to any suitable known mechanism and only the elements specific to the status of the equipment are then used.

The number of slave devices is equal to one or to more than one.

FIG. 2 illustrates the method implemented simultaneously by a set of master equipment 12 and a set of slave equipment 14.

Each set of equipment continuously performs, during the steps 210, a detection of cycles of the mains, from the detection modules 32.

For each detection, a timestamping is performed during the step 212 in each of the time bases, from the timestamping modules 160, from the time base of the master clock 142 for the master equipment 12 and from the time base of the slave clock 144 of the slave equipment. The timestamping information, namely the sequence number of the cycle and the instant of the cycle, are stored during the steps 214.

At a predetermined frequency, or for each detection of cycle, a transmission of the timestamping information not yet transmitted is carried out during the step 216 from the master equipment and the timestamping information is received during the step 218 by the slave equipment 14.

The timestamping instants of the same cycle are reconciled during the step 220 in the slave equipment, on the basis of the identification of identical cycle sequence numbers.

A calculation of the time shift between the timestamping instants of a cycle of the same sequence number is carried out during the step 222, then during step 224, a new command for the slave clock 144 being calculated and applied to said clock. The method is implemented continuously in the master equipment 12 and the slave equipment 14.

Simultaneously, the means of sound reproduction 20 provide the sound reproduction on the basis of the samples associated with the time-dependent reproduction information received from the audio signal source 23. Such reproduction is performed on the basis of a time base generated by an audio clock specific to each master equipment and slave equipment, each audio clock being synchronized with the master clock 142 for the master equipment 12 and with the slave clock 144 for the slave equipment 14.

It is understandable that with such a method, even if the mains forming a common time base of the two equipment, has a relatively unstable frequency, the permanent resynchronization of the slave master clock on the basis of the timestamping of the cycles of the mains makes it possible to have two clocks in the master equipment and the slave equipment for which the synchronization is very precise. The synchronization does not depend directly on the frequency of the mains but only on the detection of the instants of detection of the same cycle of the mains.

The invention claimed is:

1. A method of synchronizing a slave main clock of slave equipment with a master main clock of master equipment based on a common time base, including:

receiving, by the master equipment and by the slave equipment, a periodic signal of a power supply;

generating, by the master equipment and by the slave equipment, clock pulses of the common time base, based on detecting a crossing through at least one threshold of the periodic signal of the power supply;

performing from the master equipment and from the slave equipment, a master timestamping and a slave timestamping of the same clock pulse of the common time base respectively, based on the master main clock and the slave main clock, so as to generate master timestamping information and slave timestamping information;

communicating the master timestamping information to the slave equipment; and regulating, in the slave equipment, the slave main clock based on the master timestamping information communicated and based on the slave timestamping information generated.

2. The method according to claim 1, wherein the timestamping information comprises a sequence number of the clock pulse of the common time base and a timestamp of the clock pulse based on the main clock of the equipment.

3. The method according to claim 1, wherein the time base of the main clock is generated based on a sub-multiple of a clock frequency of a crystal, the sub-multiple being controlled on an external time base.

4. The method according to claim 1, wherein the time base of the main clock is generated based on a fixed sub-multiple of a clock frequency of a crystal.

5. The method according to claim 1, wherein the slave clock is controlled by an integral proportional derivative controller.

6. Slave sound reproduction equipment comprising:

a slave main clock;

a sound reproducer reproducing sound based on said slave main clock;

a first receiver receiving a periodic signal of a power supply;

a generator generating clock pulses of a common time base, based on detecting a crossing through at least one threshold of the periodic signal of the power supply;

a slave time stamper timestamping a clock pulse of the common time base based on said slave main clock, so as to generate slave timestamping information;

a second receiver receiving master timestamping information of the same clock pulse of the common time base, generated by master equipment; and a regulator, regulating, in the slave equipment, the slave main clock based on the received master timestamping information and the generated slave timestamping information.

7. Master sound reproduction equipment comprising:

a master main clock;

a sound reproducer reproducing sound based on said master main clock;

a receiver receiving a periodic signal of a power supply;

a generator generating clock pulses of a common time base, based on detection of a crossing through at least one threshold of the periodic signal of the power supply;

a time stamper performing a master timestamping of a clock pulse of the common time base on the base of based on said master main clock, so as to generate master timestamping information; and a transmitter transmitting the master timestamping information to slave equipment.

* * * * *